US005278643A

United States Patent [19]

Takemoto et al.

[11] Patent Number: 5,278,643

[45] Date of Patent: Jan. 11, 1994

[54] MONITORING APPARATUS IN GAME HALL

[75] Inventors: Takatoshi Takemoto; Toshikazu Nagai, both of Tokyo, Japan

[73] Assignee: Kabushiki Kaisha Ace Denken, Tokyo, Japan

[21] Appl. No.: 862,750

[22] PCT Filed: Oct. 4, 1991

[86] PCT No.: PCT/JP91/01356

§ 371 Date: Jun. 23, 1992

§ 102(e) Date: Jun. 23, 1992

[87] PCT Pub. No.: WO92/08529

PCT Pub. Date: May 29, 1992

[30] Foreign Application Priority Data

Nov. 9, 1990 [JP] Japan ................................ 2-305850

[51] Int. Cl.$^5$ ............................................ H04N 7/18

[52] U.S. Cl. .................................... 358/108; 358/210

[58] Field of Search ......................... 358/108, 93, 210; H04N 7/18

[56] References Cited

U.S. PATENT DOCUMENTS 4,337,482 6/1982 Coutta ................................ 358/108
4,357,015 11/1982 Santora .............................. 358/108

FOREIGN PATENT DOCUMENTS 63-5775 1/1988 Japan .
2-265583 10/1990 Japan .

*Primary Examiner*—Howard W. Britton

*Attorney, Agent, or Firm*—Lowe, Price, LeBlanc & Becker

[57] ABSTRACT

A monitoring apparatus in a game hall where a large number of game machines are disposed in lines includes a monitoring video camera, preset monitoring condition memories, drivers, abnormality sensors, a judgement processor and a monitor. The monitoring video camera includes a zoom lens, and is installed at a position for monitoring at least two of the game machines simultaneously. The preset monitoring condition memories store preset monitoring conditions of the monitoring video camera for taking a close-up of each of the game machines through the zoom lens. The drivers set the monitoring video camera according to the preset monitoring conditions and the abnormality sensors monitor a game situation. The judgment processor analyzes information based on the abnormality sensors and upon deciding that an abnormal state exists, controls the driver so as to set the monitoring video camera according to the preset monitoring conditions for the game machine corresponding to the abnormal state. Monitors display the video information of the monitoring video camera on a screen.

5 Claims, 3 Drawing Sheets

MONITORING APPARATUS IN GAME HALL

TECHNICAL FIELD

The present invention relates to a monitoring apparatus in a game hall where a large number of game machines such as slot machines and "pachinko (a Japanese upright pinball game)" machines are disposed in lines.

BACKGROUND ART

A game parlor can suffer losses due to the occurrences of abnormalities and some dishonest game players who commit wrongful acts with the intention of gaining game prizes or the like. In order to cope with the situations, various preventive measures have been proposed (refer to, for example, the official gazette of Japanese Patent Application Laid-open No. 5775/1988).

With a monitoring apparatus hitherto proposed, however, one monitoring video camera is installed for each game machine, resulting in the problem that the installation is costly.

When a plurality of game machines are to be monitored by one monitoring video camera for the purpose of solving the above problem, there is the problem that the image of each monitored game machine blurs, so the wrongful act or the abnormality cannot be satisfactorily observed and dealt with.

DISCLOSURE OF THE INVENTION

The present invention has been made in view of such problems in the prior art, and has for its object to provide a monitoring apparatus in a game hall which can improve the monitored states of individual game machines at a low installation cost.

In order to accomplish such an object, according to the present invention, there is provided a monitoring apparatus in a game hall where a large number of game machines such as slot machines are disposed in lines, characterized by comprising a monitoring video camera which includes a zoom lens, and which is installed at a position for monitoring at least two game machines; preset monitoring condition memories in which preset monitoring conditions of the monitoring video camera for taking a close-up of the each game machine through the zoom lens are respectively stored for the individual game machines; drive means for setting the monitoring video camera according to the preset monitoring conditions; abnormality sensing means for monitoring a game situation; a judgement processor which analyzes information based on the abnormality sensing means, and which, upon deciding that an abnormal state exists, controls the drive means so as to set the monitoring video camera according to the preset monitoring conditions for the game machine corresponding to the abnormal state; and display means for displaying video information of the monitoring video camera on a screen.

Preferably, the apparatus comprises video record means for storing therein the video information on the corresponding game machine, at least when the judgement processor has decided the abnormal state.

Preferably, the judgement processor includes means for actuating the display means to display the machine No. of the corresponding game machine on the screen when the game machine has been specified.

Besides, it is preferable that the display means includes abnormality warning means near the screen, and that the judgement processor includes means for actuating the abnormality warning means to give warning when it has decided the abnormal state.

Further, it is preferable that the judgement processor includes means for actuating the display means to display the machine No. of the corresponding game machine on said screen when it has decided said abnormal state.

While covering the plurality of game machines simultaneously within its visual range, the monitoring video camera is monitoring the individual game machines.

When the judgement processor has decided that there is an abnormal state on the basis of the analysis of the information of the abnormality sensing means, it controls the drive means so as to set the monitoring video camera according to the preset monitoring conditions for the abnormal game machine.

The monitoring video camera takes the close-up of the abnormal game machine through the zoom lens, where-upon an image in which the particular game machine is enlarged and is easy to see is projected on to the screen of the display means.

The video record means records, at least, the video information of the abnormal state in accordance with the instruction of the judgement processor. The video information recorded by the video record means is to be repeatedly reproduced by the display means later, whereby the abnormality can be precisely judged to so as to able to rectify the particular game machine.

In the case where the judgement processor actuates the display means to display the machine No. of the abnormal game machine on the screen upon the specification of this game machine, it is possible to immediately find which of the game machines the abnormal state has developed in.

The abnormality warning means gives the warning near the screen when the judgement processor has decided that there is an abnormal state, thereby preventing this abnormal state from being overlooked.

BEST MODE FOR CARRYING OUT THE INVENTION

Now, an embodiment of the present invention will be described in conjunction with the drawings.

Figure 1:
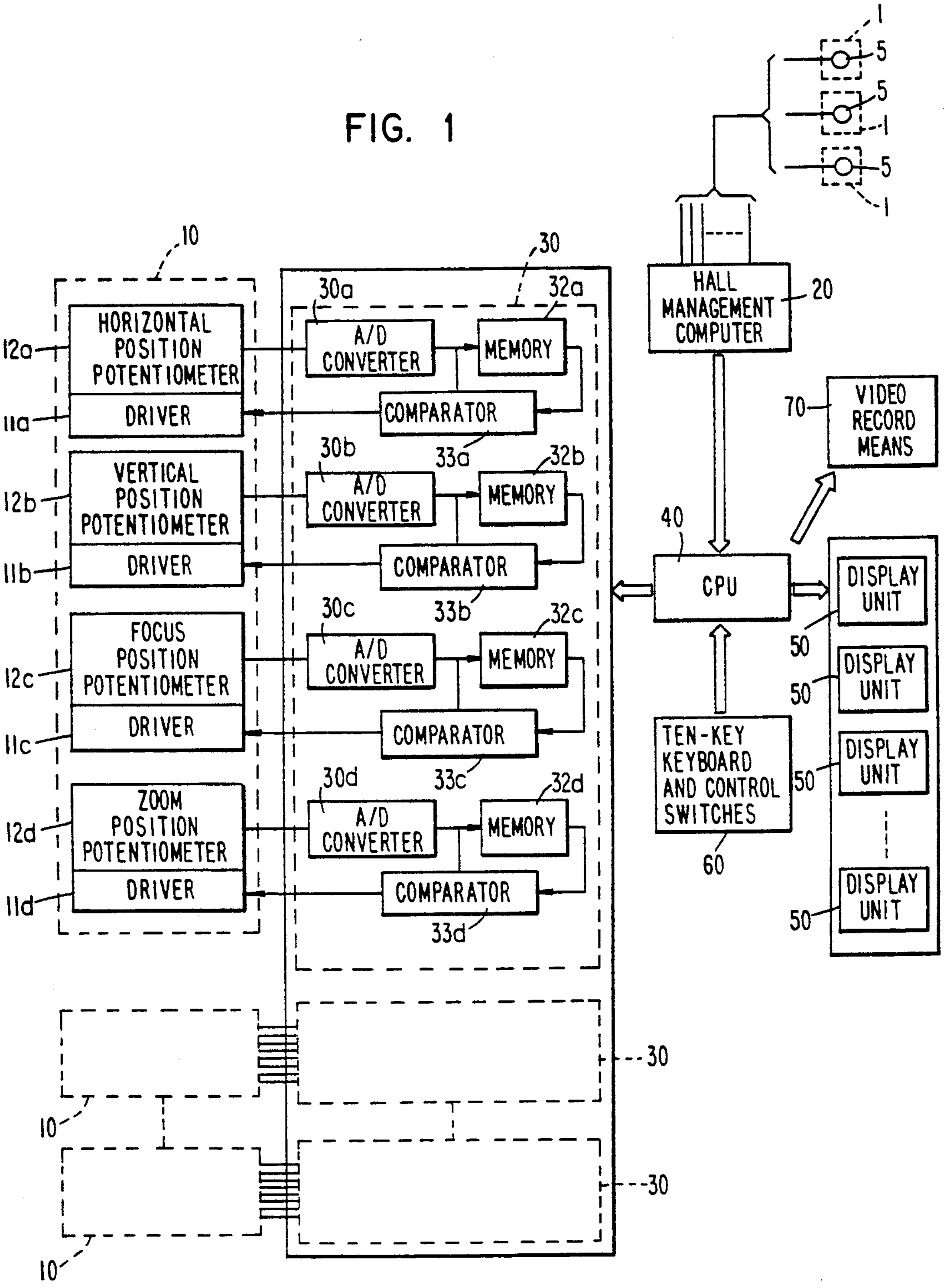
FIG. 1 is a block diagram showing the construction of the present invention.
Figure 2:
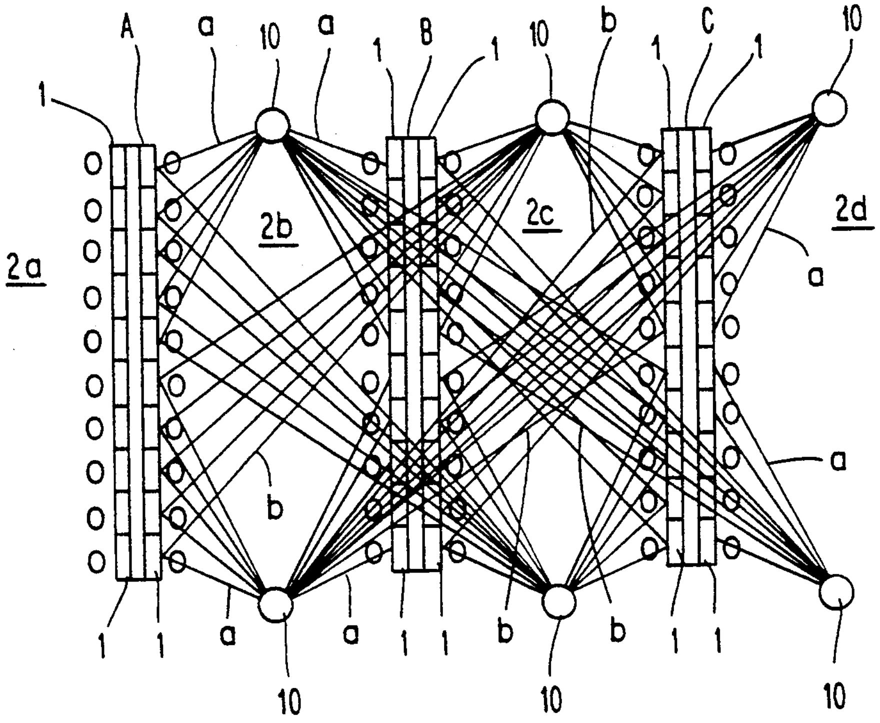
FIG. 2 is a plan view for explaining the layout of a game hall.
Figure 3:
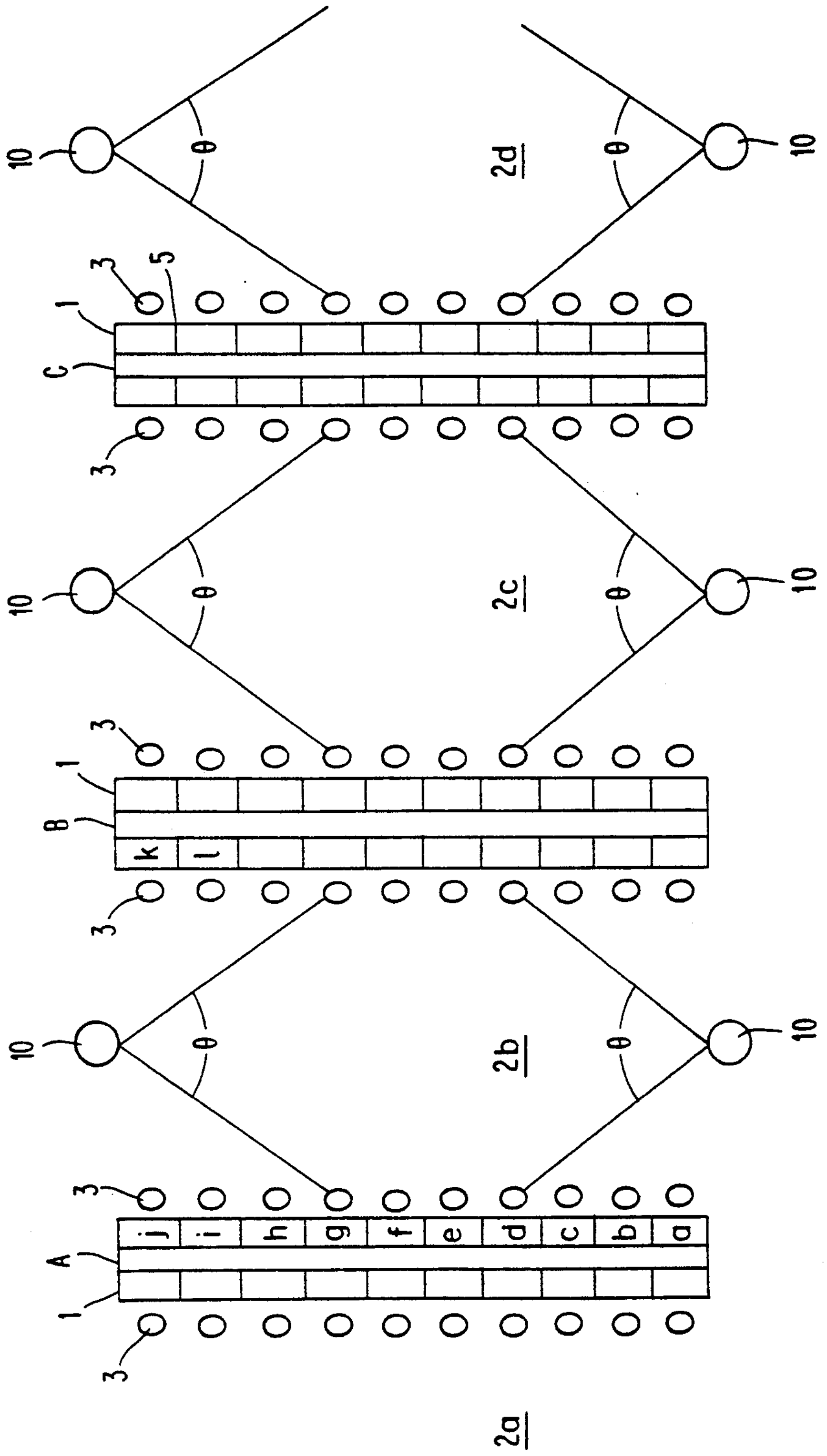
FIG. 3 is an explanatory plan view showing the angles of view of a monitoring video camera.

FIGS. 1 and 3 illustrate the embodiment of the present invention.

As shown in FIG. 3, in a game ball, a large number of game machines 1 such as slot machines and "pachinko" machines and chairs 3 are aligned within game machine islands A, B and C, and a plurality of monitoring video cameras 10 are installed at the central positions of both the ends of pathways 2*a*, 2*b*, 2*c* and 2*d* so that each camera may be capable of monitoring the game machines while covering at least two of them simultaneously within its visual range.

Lines a and b indicate the directions of specified the game machines 1 to be picked up. That is, the line a or b is the center line of each monitoring video camera 10, which can pick up the game machines corresponding to one line at a time. When the angle of the monitoring video camera 10 is changed, another visual range can be established. As shown in FIG. 3, the monitoring video cameras 10 are usually watching the pathways 2*a*, 2*b*, 2*c* and 2*d* at a certain angle of view θ. In addition, the angle of view θ can be changed by zooming.

The monitoring apparatus employing the monitoring video cameras 10 comprises as well as these monitoring video cameras 10, abnormality sensing means 5 (only shown in is panel C for illustration), a hall management computer 20, a controller 30, a CPU 40, display units 50, ten-key keyboard and control switches 60 and video record means 70.

The abnormality sensing means 5 is configured of magnetic sensors and other sensors for monitoring various game states, and is mounted on each of the game machines 1. The sensors used are a variety of sensors such as one for sensing the fact that the visual range of the monitoring video camera 10 was blocked in excess of a predetermined time period, one for sensing the fact that the front door or glass door of the game machine 1 was opened, and one for sensing high-voltage noise. In some cases, data items on game medium balls received into the game machine and delivered therefrom are sensed.

The hall management computer 20 is connected to the CPU 40, and it analyzes the information based on the abnormality sensing means 5. Upon deciding that any abnormal state exists, the computer 20 specifies the abnormal game machine 1 and notifies the CPU 40 of this machine.

The monitoring video camera 10 includes a zoom lens, and it is provided with a horizontal position driver 11*a*, a vertical position driver 11*b*, a focus position driver 11*c* and a zoom position driver 11*d* which are capable of regulating this monitoring video camera 10. The direction of the game machine 1 to become a subject can be set by the horizontal position driver 11*a* as well as the vertical position driver 11*b*, the close-up of the game machine 1 can be framed by the zoom position driver 11*d*, and the monitoring video camera can be focused by the focus position driver 11*c*. These drivers 11*a*, 11*b*, 11*c* and 11*d* constitute drive means capable of setting the monitoring video camera 10 into preset monitoring conditions for taking the close-up of each of the corresponding game machines 1 through the zoom lens.

The horizontal position, vertical position, zoom position and focus position of the monitoring video camera 10 are measured, and are sent to the controller 30 as analog signals.

The controller 30 controls the monitoring video cameras 10, and it includes A/D converters 30*a*, 30*b*, 30*c* and 30*d*, preset monitoring condition memories 32*a*, 32*b*, 32*c* and 32*d*, and comparators 33*a*, 33*b*, 33*c* and 33*d* in correspondence with respective potentiometers 12*a*, 12*b*, 12*c* and 12*d*. The A/D converters 30*a*, 30*b*, 30*c* and 30*d* receive the analog signals from the corresponding potentiometers and convert them into digital signals, respectively. The present monitoring condition memories 32*a*, 32*b*, 32*c* and 32*d* store the digital signals from the corresponding A/D converters therein, respectively. In the preset monitoring condition memories 32*a*, 32*b*, 32*c* and 32*d*, the digital signals generated when the corresponding monitoring video camera 10 has been set according to the respective preset monitoring conditions can be stored for each of the game machines 1.

When the hall management computer 20 has decided that any of the game machines 1 is in the abnormal state, the CPU 40 controls the comparators 33*a*, 33*b*, 33*c* and 33*d* so as to set the monitoring video camera 10 into the respective preset monitoring conditions for the abnormal game machine 1. Besides, when the game machine 1 has been specified by the hall management computer 20 or the ten-key keyboard and control switches 60, the CPU 40 actuates the display unit 50 to display on the screen thereof the machine No. of the game machine 1 and the significance of a displayed picture, such as whether the abnormal state is ascribable to the abnormality of the game machine or the end of a game, and whether the abnormal state is ascribable to a wrongful act or any other abnormality. The time of the occurrence of the abnormal state and so forth are also displayed.

The respective comparators 33*a*, 33*b*, 33*c* and 33*d* receive the digital signals from the corresponding A/D converters, and also receive the stored information items of the specified game machine 1 held in the corresponding preset monitoring condition memories under the control of the CPU 40. Then, they detect the deviations between the current positions of the monitoring video camera 10 and the positions of the preset monitoring conditions for the specified game machine 1, and they supply the corresponding drivers with signals of values for bringing the current positions into agreement with the positions of the preset monitoring conditions, thereby controlling these drivers.

The hall management computer 20, controller 30 and CPU 40 constitute a judgement processor which decides the end of the game and the abnormal situation, and which controls the drivers 11*a*, 11*b*, 11*c* and 11*d*.

The plurality of display units 50 constitute display means made up of CRTs which are connected to the CPU 40 and which display the video information of the monitoring video cameras 10 on the screen thereof, and they are disposed in correspondance with the individual monitoring video cameras 10. In addition, each of the display units 50 includes abnormality warning means (not shown) made up of a pilot lamp, near the screen. The abnormality warning means is controlled by the CPU 40, and it lights up or flickers to give a warning in the display unit 50 corresponding to the monitoring video camera 10 pertinent to the abnormal game machine 1 when the hall management computer 20 has decided that the abnormal state exists.

The ten-key keyboard and control switches 60 are connected to the CPU 40. Thus, when the machine No. of the game machine 1 to be monitored has been set using ten-key keyboard, these switches 60 instruct the CPU 40 to perform a control so that the monitoring video camera 10 may be set according to the preset monitoring conditions for the particular game machine 1 and may take a close-up picture of this game machine 1.

The video record means 70 is a video deck equipment which is connected to the CPU 40, and which stores the video information of the game machine 1 on a video tape, at least, when the hall management computer 20 has decided that there is the abnormal state. It is also possible to connect a hard copy equipment capable of recording a video image itself on a sheet of paper, to the CPU 40.

Next, the operation will be described.

The monitoring video cameras 10 are watching the game machines 1 in such a manner that each monitoring video camera covers at least two of the game machines 1 simultaneously within its visual range. The images of the plurality of game machines 1 picked up by the plurality of monitoring video cameras 10 are projected by the display units 50 corresponding to the respective monitoring video cameras 10. The information items from the various sensors constituting the abnormality sensing means are continually sent to the hall management computer 20, which analyzes the various information items and decides if an abnormal state occurs. This abnormal state corresponds to, for example, the end of the game, a case where any wrongful act is presumed have been commited the blocking of the front of the monitoring video camera 10 for longer than the predetermined time period, the opening of the front window of the game machine 1, the operation of the magnetic sensor, the operation of the noise sensor, or a case where the number of game prize balls is abnormally large. When the game machine 1 involves such an abnormality, it is noticed.

In a previous manual operation mode, the CPU 40 is used for registering the machine No. of each game machine 1 and for choosing and registering the monitoring video camera 10 which is most suited to observe the game machine 1 of the registered machine No. Further, regarding the monitoring video camera 10 registered, in order to take the close-up of the game machine 1 of the registered machine No. and to project the image of this game machine in a state to enable better observation, the horizontal position, vertical position, focus position and zoom position are regulated, the analog values of the respective potentiometers 12*a*, 12*b*, 12*c* and 12*d* are converted by the corresponding A/D converters, and the resulting digital values are stored in the respective preset monitoring condition memories 32*a*, 32*b*, 32*c* and 32*d*. These operations are repeated to set the preset monitoring conditions of the monitoring video cameras 10 for all the game machines 1 in the game hall. Incidentally, the preset monitoring conditions may well be set for a corner where the game balls are exchanged for a game prize, a gaming medal counter, the pathways 2, 3, and 4, etc., as well as for the game machines 1.

In the presence of any abnormality, when the hall management computer 20 has decided that an abnormal state exists through the analysis of the information items of the abnormality sensing means, the CPU 40 notified of the machine No. of the abnormal game machine 1 controls the controller 30 so that the monitoring video camera 10 registered as being most suited to observe the particular game machine 1 may be set according to the preset monitoring conditions for that game machine 1. The controller 30 controls the respective drivers 11*a*, 11*b*, 11*c* and 11*d* to set the monitoring video camera 10 into the preset monitoring conditions for the abnormal game machine 1.

The monitoring video camera 10 has the horizontal position and vertical position thereof adjusted to the abnormal game machine 1 and has the zoom position and focus position of the zoom lens adjusted to the same, whereupon it quickly takes the focused close-up of the game machine 1 with an appropriate framing.

The image of the game machine 1 in the abnormal state and the game player of this game machine which is enlarged to enable better observation by the monitoring video camera 10 is projected on the screen of the display unit 50. Also, when the game machine 1 has been specified, the CPU 40 actuates the display unit 50 to display the machine No. of the game machine 1, the significance of the displayed picture, such as whether the abnormal state is ascribable to the end of the game or to a wrongful act or any other abnormality, the time of the occurrence of the abnormal state, and so forth on the partial area of the display screen of the display unit. Thus, it is possible to immediately know which of the game machines the abnormal state has developed in.

The abnormality warning means lights up or flickers to give a warning near the screen of the display unit 40 corresponding to the monitoring video camera 10 pertinent to the abnormal game machine 1 when the hall management computer 20 has decided that there is an abnormal state. Thus, the abnormality warning means makes it known which of the display units 50 the abnormality is projected only, thereby preventing the abnormal state from being overlooked.

The video record means 70 may record video information throughout business hours or during only some of them, but it needs to record, at least, the video information of the game machine 1 found to be in the abnormal state. The video information recorded by the video record means 70 is to be repeatedly reproduced on the screen of the display unit 50 later, thereby examining the situation of the abnormality by comparisons. Thus, in the case of any wrongful act, it is possible to pay attention to a suspected person and to exactly judge and specify the abnormality.

As stated above, the monitoring video camera 10 can be automatically set according to the preset monitoring conditions by the abnormality sensing means. Moreover, in such a case where a manager has been informed of any wrongful act by, e.g., a clerk, he/she manipulates the ten-key keyboard and control switches 60 so as to input the No. of the game machine desired to be monitored, whereby the monitoring video camera 10 can be set according to the preset monitoring conditions so as to take the close-up of the particular game machine 1, and the image of the game machine 1 and the game player thereof which are enlarged to enable better observation can be projected onto the screen of the display unit 50.

In the presence of the abnormal state, it is displayed by the display unit 50 with the game machine 1 specified. Then, the manager of the game hall determines the abnormal state and deals with it appropriately.

Incidentally, apart from the video deck, the video record means can utilize any of various recording media such as magnetic disks and optical disks. Apart from the cathode-ray tubes, the display means may well be configured of any of liquid-crystal display units, etc.

Incidentally, only one display unit may well be shared by a plurality of monitoring video cameras. More specifically, while the hall management computer 20 does not inform the CPU of any abnormal state, the CPU changes-over the plurality of monitoring video cameras in time division so as to project images from these cameras on the screen of the display unit. In this case, the images of the game machines picked up by the plurality of monitoring video cameras are changed-over by the time-division control of the CPU. In contrast, when the hall management computer has decided that any of the game machines are in an abnormal state, the image from the monitoring video camera corresponding to the abnormal game machine is interruptively displayed in preference to the images from the other monitoring video cameras by the display unit, and the images of the plurality of game machines from the particular camera are projected in succession.

Besides, the abnormality warning means may well light up or flicker to give a warning while making the distinction between the case of the end of a game and the case of a wrongful act or any other abnormality. Further, each display unit may well be provided with a plurality of abnormality warning means, not the single means. The abnormality warning means may well be warning means other than the pilot lamps, such as sounding means. On this occasion, the No. of the displayed machine is projected onto a part of the screen.

INDUSTRIAL APPLICABILITY

With a monitoring apparatus in a game hall according to the present invention, each monitoring video camera for watching a plurality of game machines takes a close-up of the game machine which is determined as being in an abnormal state, and this close-up view of the abnormal game machine is projected. Therefore, the monitored state of each game machine is improved at a low installation cost, and the invention is very effective to promptly cope with any abnormality and to prevent dishonest act.

We claim:

1. A monitoring apparatus in a game hall where a large number of game machines are disposed in lines, said monitoring apparatus comprising:
   - a monitoring video camera which includes a zoom lens, and which is installed at a position for monitoring at least two of said game machines simultaneously;
   - preset monitoring condition memories in which preset monitoring conditions of said monitoring video camera for taking a close-up of said each game machine through said zoom lens are respectively stored for the individual game machines;
   - drive means for setting said monitoring video camera to face a particular game machine and driving said zoom lens to zoom according to said preset monitoring conditions;
   - abnormality sensing means for sensing abnormalities occurring in individual game machines, respectively;
   - a judgement processor which analyzes information based on said abnormality sensing means, and which, upon deciding that an abnormal state exists, controls said drive means so as to set said monitoring video camera according to said preset monitoring conditions for a particular game machine corresponding to the abnormal state; and
   - display means for displaying video information of said monitoring video camera on a screen.

2. A monitoring apparatus in a game hall as defined in claim 1, characterized by comprising video record means for storing therein the video information on the corresponding game machine, at least when said judgement processor has decided that said abnormal state exists.

3. A monitoring apparatus in a game hall as defined in claim 1, characterized in that said judgement processor includes means for actuating said display means to display machine No. of the corresponding game machine on said screen when said game machine has been specified.

4. A monitoring apparatus in a game hall as defined in claim 1, characterized in that said display means includes abnormality warning means near said screen, and that said judgement processor includes means for actuating said abnormality warning means to give a warning when it has been decided that said abnormal state exists.

5. A monitoring apparatus in a game hall as defined in claim 1, characterized in that said judgement processor includes means for actuating said display means to display the machine No. of the corresponding game machine on said screen when it has been decided said abnormal state exists.

* * * * *